United States Patent Office 3,424,743
Patented Jan. 28, 1969

3,424,743
SPIRAMYCIN-3-MONOESTERS
Keizo Uzu, Hiroshi Takahira, Hiromasa Kato, Noriyuki Sugiyama, Tomotsune Haneda, and Sumihiro Ishii, Shizuoka-ken, Japan, assignors to Societe des Usines Chimiques, Phone-Poulenc, Paris, France, a corporation of Japan
Filed Mar. 2, 1966, Ser. No. 531,290
Claims priority, application Japan, Mar. 2, 1965, 40/11,619
U.S. Cl. 260—210          3 Claims
Int. Cl. A61k 21/00; C08b 19/00; C07g 3/00

ABSTRACT OF THE DISCLOSURE

Lower alkanoyl 3-monoesters of spiramycin, such as spiramycin 3-monoacetate and spiramycin 3-monopropionate, and a process for preparing the same which comprises hydrolyzing the corresponding diester with an alcohol, an alkali or an acid to give the monoester. The lower alkanoyl 3-monoesters of spiramycin have a greater therapeutic effect than spiramycin itself.

---

This invention relates to novel derivatives of spiramycin. More particularly, it relates to spiramycin monoesters and a process for the preparation of spiramycin monoesters. Even more particularly, the invention relates to spiramycin monoesters and a hydrolysis process for preparing the same.

Spiramycin is an antibiotic belonging to the macrolide group (Japanese patent publication No. 4,599/36) and is used to a great extent clinically.

Spiramycin is a mixture consisting of three types of components, such as spiramycin I, spiramycin II and spiramycin III. When the isolated compounds spiramycin I, spiramycin II and spiramycin III as well as the mixture thereof are catalytically reduced, the tetrahydro derivatives obtained are found to be biochemically active.

Spiramycin has the following structure:

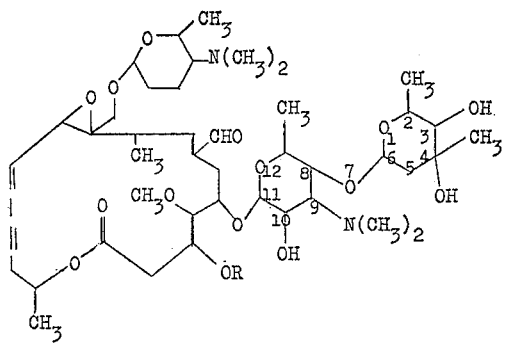

In the case of spiramycin I, R=H
In the case of spiramycin II, R=CH₃CO
In the case of spiramycin III, R=C₂H₅CO The spiramycin produced by the process of the present invention involves all of the structures set forth above.

It is known in the prior art to prepare spiramycin diesters by esterifying spiramycin with various kinds of acylating agents such as acetic anhydride (Japanese patent publication No. 1619/33). However, when acylating agents such as acid anhydrides are used to attack the spiramycin molecule, the hydroxy group at the 10-position in the vicinity of the dimethylamino group is acylated first. This is followed by the acylation of the hydroxy group at the 3-position. Accordingly, it is impossible to esterify the hydroxy group at the 3-position selectively in such processes so that only the monoester is obtained.

One of the objects of the present invention is to provide a process for the preparation of lower alkanoyl monoesters of spiramycin.

Another object of the present invention is to provide a process for the preparation of monoesters of spiramycin which may be carried in an efficacious manner.

A further object of the invention is to provide a process for preparing monoesters of spiramycin which gives the product in good yield.

A still further object of the invention is to provide a process for preparation of novel derivatives of spiramycin which have a greater therapeutic effect than spiramycin itself.

Yet another object of the present invention is to provide novel derivatives of spiramycin, i.e., spiramycin monoesters.

These and other objects and advantages of the present invention will become apparent to those skilled in the art from a consideration of the following specification and claims and of the attached drawings wherein:

As discussed above, diesters of spiramycin are produced when spiramycin is subjected to reaction with acid anhydrides in the presence of pyridine. In accordance with the present invention, spiramycin monoesters are obtained by the alcoholysis or hydrolysis of such diesters with substances such as methanol, ethanol, alkalis, acids and the like. By this method, it is possible to achieve a selective esterification at the 3-position hydroxy group of the spiramycin molecule. Thus, the present invention makes it possible to obtain monoesters of spiramycin by the hydrolysis of spiramycin diesters with alcohol such as methanol and ethanol, alkalis or acids by hydrolyzing the ester bond present in the vicinity of the dimethylamino group of the diester, i.e., at the 10-position thereof.

Pure alcohols or aqueous alcoholic solutions may be used as the hydrolyzing agent in the present invention. In addition, aqueous alcoholic solutions containing compounds such as Na₂CO₃, NaHCO₃ and ammonia and acidic solutions containing inorganic and organic acids such as hydrochloric acid, sulfuric acid, phosphoric acid, acetic acid, formic acid and the like may also be used.

The particular reaction conditions to be used for the hydrolysis vary depending upon the particular hydrolyzing agent employed. For example, when 80% aqueous methanol is used, it is satisfacory to leave the mixture of diester of spiramycin and aqueous methanol standing for 24 hours at 60° C. Further prolongation of the reaction time makes the hydrolysis proceed further and to produce the original spiramycin. Consequently, in order to stop the reaction when the monoester is formed, appropriate reaction conditions, i.e., temperature and reaction time, must be selected.

Several preferable reaction conditions are exemplified as follows:

| Reaction | Hydrolyzing agents | Temp., °C. | Time |
|---|---|---|---|
| Diacetate → monoacetate. | 80% methanol | 60 | 24 hrs. |
| Do | 10% Na₂CO (in 50% methanol). | 20 | 30 mins. |
| Do | 10% ammonia in methanol. | 20 | 30 mins. |
| Dipropionate → monopropionate. | 80% methanol | 60 | 20 hrs. |
| Do | 0.1 N-HCl | 37 | 48 hrs. |

Spiramycin 3-monoacetate and spiramycin 3-monopropionate prepared by the present invention displayed the characterizing properties enumerated in Table 1.

TABLE 1

|  | Spiramycin 3-monoacetate | Spiramycin 3-monopropionate |
|---|---|---|
| Elemental analysis, percent: | | |
| C | 60.58 | 60.95 |
| H | 8.80 | 8.54 |
| N | 2.90 | 2.85 |
| Melting point, °C | 117–120 | 112–115 |
| pK$_a$ (ionization constant) | 6.9 | 7.0 |
| Infra-red absorption curve | (¹) | (²) |
| Acetyl group, moles | 1.95 | 2.1 |

Figure 1:
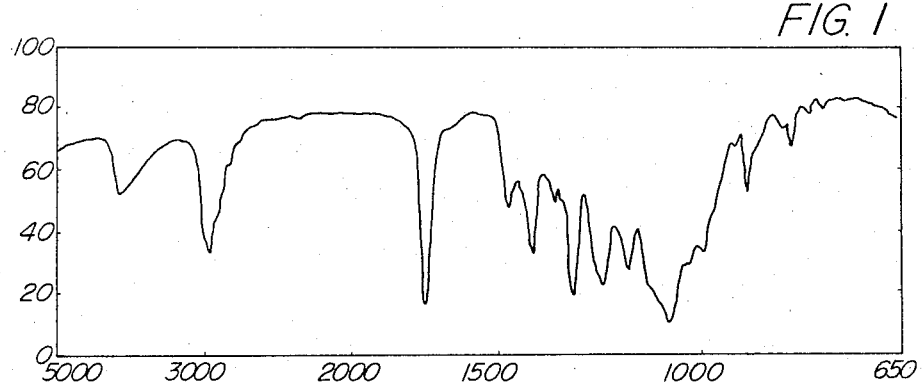
FIGURE 1 shows an infra-red absorption curve of spiramycin 3-monoacetate.
Figure 2:
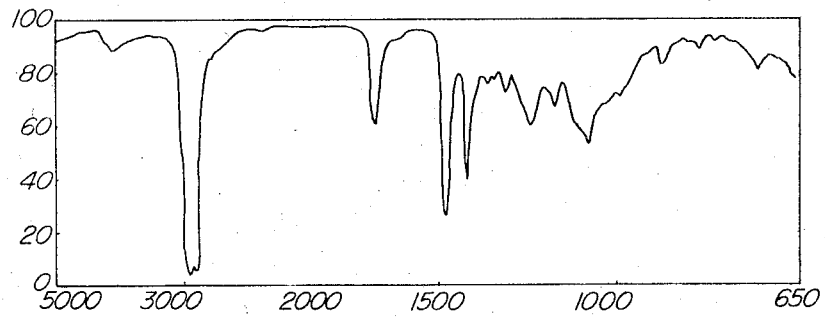
FIGURE 2 shows an infra-red absorption curve of spiramycin 3-monopropionate.

¹ Fig. 1.  ² Fig. 2.

It has also been found that the monoacetate and monopropionate derivatives of spiramycin obtained by the present invention both possess stronger therapeutic effects than that of spiramycin itself. In fact, these derivatives show an effect approximately equivalent to that of spiramycin even when an amount of ⅓ to ¼ of the amount of spiramycin is used. Table 2 shows the results of infection tests against *Staphylococcus aureus* (Neuman) carried out in mice.

TABLE 2

| | Dose, mg. each mouse | Number of deaths, days | | | | | | | | | | Total number of deaths |
|---|---|---|---|---|---|---|---|---|---|---|---|---|
| | | 1 | 2 | 3 | 4 | 5 | 6 | 7 | 8 | 9 | 10 | |
| Control | | | 5 | 4 | 1 | | | | | | | 10 |
| Spiramycin | 5 | | | 2 | 5 | | 1 | 1 | | 1 | | 10 |
| Spiramycin 3-monoacetate | 1.25 | | | 3 | 2 | | 1 | 1 | | 1 | | 8 |
| Spiramycin 3-monopropionate | 1.25 | | 2 | 1 | 1 | | | | 1 | 2 | 1 | 8 |

It can thus be seen that spiramycin 3-monoacetate and spiramycin 3-monopropionate have considerably stronger therapeutic effects than spiramycin.

The following examples of the preparation of monoesters of spiramycin in accordance with the present invention are given merely as illustrative thereof and are not to be considered as limiting.

Example 1

Two grams of spiramycin complex is dissolved in 4 cc. of acetic acid anhydride containing 0.1 cc. of pyridine and allowed to stand at 40° C. for 1–2 days. The resultant solution is subsequently poured into 100 ml. of ice water and at the completion of the hydrolysis of excess acetic acid anhydride the solution is adjusted to a pH of 7 with sodium hydroxide. The precipitate obtained is filtered, washed with 5 cc. of water and dried in a vacuum. Two grams of the dried material obtained is dissolved in 10 cc. of 80% aqueous methanol solution and allowed to stand for one day at 60° C. The resultant solution is then concentrated and dissolved in 20 cc. of chloroform. The chloroform is then evaporated therefrom.

There is obtained 1.8 grams of spiramycin 3-monoacetate having a melting point of 117°–120° C.

Example 2

The same procedure as described in Example 1 is carried out except that 2 grams of spiramycin complex is dissolved in 4 cc. of propionic anhydride containing 0.1 cc. of pyridine. As a result, 1.8 grams of spiramycin 3-monopropionate is obtained having a melting point of 112°–115° C.

The invention being thus described, it will be obvious that the same may be varied in many ways. Such variations are not to be regarded as a departure from the spirit and scope of the invention, and all such modifications are intended to be included within the scope of the following claims.

What we claim is:
1. A lower alkanoyl 3-monoester of spiramycin.
2. Spiramycin 3-monoacetate.
3. Spiramycin 3-monopropionate.

References Cited

UNITED STATES PATENTS 3,000,786   9/1961   Wettstein et al. _____ 260—210
3,011,947   12/1961  Preud'homme et al. __ 260—210
3,318,866   5/1967   Hoeksema et al. _____ 260—210

LEWIS GOTTS, *Primary Examiner.*

JOHNNIE R. BROWN, *Assistant Examiner.*

U.S. Cl. X.R.

260—999